(12) United States Patent
Ding et al.

(10) Patent No.: US 9,077,632 B2
(45) Date of Patent: Jul. 7, 2015

(54) INTERWORKING BETWEEN ETHERNET AND MPLS

(75) Inventors: Zhemin Ding, Stockholm (SE); Panagiotis Saltsidis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 147 days.

(21) Appl. No.: 13/695,699

(22) PCT Filed: May 4, 2010

(86) PCT No.: PCT/SE2010/050484
§ 371 (c)(1),
(2), (4) Date: Nov. 1, 2012

(87) PCT Pub. No.: WO2011/139188
PCT Pub. Date: Nov. 10, 2011

(65) Prior Publication Data
US 2013/0051245 A1 Feb. 28, 2013

(51) Int. Cl.
*H04L 12/26* (2006.01)
*H04L 12/721* (2013.01)

(52) U.S. Cl.
CPC ............ *H04L 43/10* (2013.01); *H04L 45/26* (2013.01); *H04L 45/34* (2013.01)

(58) Field of Classification Search
None
See application file for complete search history.

(56) References Cited

U.S. PATENT DOCUMENTS

| | | | |
|---|---|---|---|
| 8,064,365 B2 * | 11/2011 | Amemiya et al. | 370/254 |
| 8,144,715 B2 * | 3/2012 | Ould Brahim et al. | 370/401 |
| 2007/0025256 A1 * | 2/2007 | Hertoghs et al. | 370/236.2 |
| 2008/0101241 A1 * | 5/2008 | Mohan et al. | 370/236.2 |
| 2008/0144632 A1 * | 6/2008 | Rabie et al. | 370/395.5 |
| 2008/0144657 A1 * | 6/2008 | Li | 370/466 |
| 2008/0151907 A1 * | 6/2008 | Ge et al. | 370/395.53 |
| 2008/0172497 A1 | 7/2008 | Mohan et al. | |
| 2008/0253299 A1 * | 10/2008 | Damm et al. | 370/252 |
| 2008/0285466 A1 | 11/2008 | Salam et al. | |
| 2009/0113070 A1 * | 4/2009 | Mehta et al. | 709/238 |

(Continued)

FOREIGN PATENT DOCUMENTS

EP 1933506 A1 6/2008

OTHER PUBLICATIONS

Bocci, M. et al. "Enhancing Converged MPLS Data Networks with ATM, Frame Relay and Ethernet Interworking." The Journal of the Communications Network, vol. 3, Part 4, Oct.-Dec. 2004, pp. 11-17.

(Continued)

*Primary Examiner* — Anh-Vu Ly
(74) *Attorney, Agent, or Firm* — Coats and Bennett, PLLC (57) ABSTRACT

A source node for addressing target nodes (44, 46) in a communication system (10), the source node configured to be part of an Ethernet domain (20) and the target nodes (44, 46) configured to be part of a Multiple Protocol Label Switching (MPLS) domain (40) that is connected to the Ethernet domain (20) via an interworking node (30). The source node is further configured to: i) generate a message (51) comprising an identifier of the source node, an identifier of the interworking node (30), and an identifier of a certain target node (44) of the target nodes (44, 46), ii) send the message (51) to the certain target node (44) via the interworking node (30), and iii) receive from the certain target node (44) via interworking node (30) a reply (54) to the message (51). An alternate source node, related interworking nodes and methods are also described.

25 Claims, 5 Drawing Sheets

(56) References Cited

U.S. PATENT DOCUMENTS

| | | | |
|---|---|---|---|
| 2009/0285089 A1* | 11/2009 | Srinivasan | 370/218 |
| 2010/0238791 A1* | 9/2010 | Duncan et al. | 370/216 |
| 2010/0246603 A1* | 9/2010 | Rabie et al. | 370/466 |
| 2010/0290345 A1* | 11/2010 | Gero et al. | 370/241.1 |
| 2011/0141914 A1* | 6/2011 | Yang et al. | 370/242 |
| 2012/0063325 A1* | 3/2012 | Zhao et al. | 370/241.1 |
| 2012/0120809 A1* | 5/2012 | Gero et al. | 370/241.1 |
| 2013/0148489 A1* | 6/2013 | Boutros et al. | 370/216 |
| 2013/0201837 A1* | 8/2013 | Berechya et al. | 370/241.1 |
| 2013/0287030 A1* | 10/2013 | Mohan et al. | 370/392 |

OTHER PUBLICATIONS

Author Unknown. "Ethernet-MPLS network interworking—User plane interworking." Series Y: Global Information Infrastructure, Internet Protocol Aspects and Next-Generation Networks, Internet protocol aspects—Interworking, ITU-T Recommendation Y. 1415, Feb. 2005, pp. 1-20.

* cited by examiner

INTERWORKING BETWEEN ETHERNET AND MPLS

TECHNICAL FIELD

The invention relates to a source node that is a part of an Ethernet domain connected to a Multiple Protocol Label Switching (MPLS) domain, and to an interworking node that connects the Ethernet domain with the MPLS domain. Alternatively the source node is a part of the MPLS domain.

BACKGROUND

The following abbreviations are used throughout this document:
ACH Associated Channel Header
CC Continuity Check
CFM Connectivity Fault Management
CV Connection Verification
IW Interworking
LBM Loopback message
LBR Loopback reply
LSR Label Switching Router
LSP Label Switched Path
LTM Linktrace message
LTR Linktrace reply
MA Maintenance Association
MAC address Media Access Control address
MEP Maintenance Association End Point
MIP Maintenance Domain Intermediate Point
MPLS Multiple Protocol Label Switching
MPLS-TP MPLS Transport Profile
OAM Operation, Administration and Maintenance
PW Pseudo Wire
TLV Type Length Value
TTL Time To Live In communication systems Loopback is generally used to describe methods or procedures for routing electronic signals, digital data streams, or other flows of items, from their originating facility quickly back to the same source entity without intentional processing or modification. Loopback is primarily intended as a means of testing the transmission or transportation infrastructure. In general, the routing of signal is initiated at a maintenance node, transmitted to a target node and back again to the maintenance node.

Examples of Loopback applications include e.g. performing transmission tests of access lines from a serving switching center (i.e. from the maintenance node), which usually does not require the assistance of personnel at the served terminal (i.e. at the target node). Loopback is often used as an aid in debugging physical connection problems between various nodes.

In the same communication systems so called Linktrace is often also performed, which describes methods or procedures that perform path discovery and fault isolation, which includes a possibility to map the topology of the communication system. Both Linktrace and Loopback as well as other, similar functionality such as continuity check (CC) are often grouped under and referred to as connectivity fault functions within the operation and maintenance (OAM) group of functions which usually contains performance monitoring functions as well.

In some communication systems different types of network technologies are combined, for example when an Ethernet network is combined with a network implemented according with technology for a Multiple Protocol Label Switching (MPLS) network. Performing OAM operations can in this case be more challenging since the functionality must enable cooperation (i.e. interwork) between the different types of networks. In a more general perspective, using a node in the Ethernet network for finding a node in the MPLS network or using a node in the MPLS network for finding a node in the Ethernet network can be troublesome.

As an example of prior art, US2008/0144657 describes an apparatus for realizing OAM function interworking between an Ethernet network and an MPLS network. The apparatus can realize OAM functions when MPLS serves as a bearer network to bear Ethernet services, and provides processing modes for different kinds of OAM functions. Based on the Ethernet-MPLS service interworking function model defined in ITU-T Recommendation Y.1415, the embodiments of the apparatus realizes interworking of Ethernet OAM functions defined in ITU-T Draft Recommendation Y.17ethoam and MPLS OAM functions defined in ITU-T Recommendation Y.1711 on network layer, which shall ensure an end-to-end OAM interworking mechanism between Ethernet and MPLS networks.

Even though exemplified and other existing techniques can provide some interworking between en Ethernet based network and an MPLS based network, it is appreciated that improvements are required for making interworking more applicable and operator friendly.

SUMMARY

It is an object of the invention to at least partly overcome one or more of the above-identified limitations of the prior art. In particular, it is an object to provide improved interworking between an Ethernet based network and an MPLS based network. This may include identifying and/or addressing nodes in one type of network from another type of network, for example when OAM operations shall be performed.

Hence a source node is provided for addressing target nodes in a communication system. The source node is configured to be part of an Ethernet domain and the target nodes are configured to be part of a Multiple Protocol Label Switching (MPLS) domain that is connected to the Ethernet domain via an interworking node. The source node is further configured to: i) generate a message comprising an identifier of the source node, an identifier of the interworking node, and identifier of a certain target node of the target nodes, ii) send the message to the certain target node via the interworking node, and iii) receive from the certain target node via interworking node a reply to the message.

The source node may be a maintenance node for monitoring the target nodes, and the source node may be configured to generate the message as an operations, administration and management (OAM) message.

The OAM message may be a Linktrace message or a Loopback message.

The message may comprise a basic OAM message that may be enhanced by a value representing the identifier of the certain target node.

The value representing the identifier of the certain target node may comprise a type length value.

The identifier of the source node may comprise an Ethernet type address.

The identifier of the interworking node may comprise an Ethernet type address.

The identifier of the certain target node may comprise an MPLS type address.

The source node may also be configured to i) generate a Linktrace message comprising an identifier of the source node, and an identifier of the interworking node, ii) send the Linktrace message via the interworking node and to a number of additional target nodes in the MPLS domain, and iii) receive from the number of additional target nodes via the interworking node a Linktrace reply to the Linktrace message, the Linktrace reply comprising identifiers of the additional target nodes.

The identifiers of the additional target nodes may comprise MPLS type addresses.

The source node may be configured to generate a database that comprises the identifiers of the additional target nodes in the MPLS domain.

The message may comprise a flag that indicates if the message comprises an identifier of a certain target node in the MPLS domain.

According to another aspect an interworking (IW) node is provided for transferring a message in a communication system. The interworking node is configured to connect an Ethernet domain with a Multiple Protocol Label Switching (MPLS) domain, wherein the Ethernet domain comprises a source node and the MPLS domain comprises target nodes. The interworking node is further configured to: i) receive from the source node a message comprising an identifier of the source node, an identifier of the interworking node, and an identifier of a certain target node of the target nodes, ii) convert the message from an Ethernet format to an MPLS format, iii) send the converted message to the certain target node, iv) receive from the certain target node a reply to the converted message, v) convert the reply from an MPLS format to an Ethernet format, and vi) send the converted reply to the source node.

For the interworking node the message may comprises an operations, administration and management (OAM) message, the OAM message may be a Linktrace message or a Loopback message, the message may comprises a basic OAM message that may be enhanced by a value representing the identifier of the certain target node. The value representing the identifier of the certain target node may comprise a type length value.

Also, for the interworking node the identifier of the source node may comprise an Ethernet type address, the identifier of the interworking node may comprise an Ethernet type address and the identifier of the certain target node may comprise an MPLS type address. Additionally, the identifiers of the additional target nodes may comprise MPLS type addresses and the message may comprise a flag that indicates if the message comprises an identifier of a certain target node in the MPLS domain.

The interworking node may be further configured to i) receive a Linktrace message comprising an identifier of the source node, and an identifier of the interworking node, ii) convert the Linktrace message from an Ethernet format to an MPLS format, iii) send the converted Linktrace message to additional target nodes in the MPLS domain, vi) receive from an additional target node a Linktrace reply to the converted Linktrace message, v) convert the Linktrace reply from an MPLS format to an Ethernet format, and vi) send the converted Linktrace reply to the source node, the converted Linktrace reply comprising identifiers of the additional target nodes.

According to another aspect a method is provided for a source node adapted to address target nodes in a communication system. The source node configured to be part of an Ethernet domain and the target nodes configured to be part of a Multiple Protocol Label Switching (MPLS) domain that is connected to the Ethernet domain via an interworking node. The method for the source node comprises the steps of: i) generating a message comprising an identifier of the source node, an identifier of the interworking node, and an identifier of a certain target node of the target nodes, ii) sending the message to the certain target node via the interworking node, and iii) receiving from the certain target node via interworking node a reply to the message.

According to another aspect a method is provided for an interworking node adapted to transfer a message in a communication system, the interworking node configured to connect an Ethernet domain with a Multiple Protocol Label Switching (MPLS) domain, wherein the Ethernet domain comprises a source node and the MPLS domain comprises target nodes. The method for the interworking node comprises the steps of: i) receiving from the source node a message comprising an identifier of the source node, an identifier of the interworking node, and an identifier of a certain target node of the target nodes, ii) converting the message from an Ethernet format to an MPLS format, iii) sending the converted message to the certain target node, iv) receiving from the certain target node a reply to the converted message, v) converting the reply from an MPLS format to an Ethernet format, and vi) sending the converted reply to the source node.

According to still another aspect a source node is provided for addressing target nodes in a communication system. The source node is configured to be part of a Multiple Protocol Label Switching (MPLS) domain and the target nodes configured to be part of an Ethernet domain that is connected to the MPLS domain via an interworking node. The source node is further configured to: i) generate a message comprising an identifier of the source node, an identifier of the interworking node, and an identifier of a certain target node of the target nodes, ii) send the message to the certain target node via the interworking node, and iii) receive from the certain target node via interworking node a reply to the message.

The source node that is a part of the MPLS domain may implement all features described above and applicable for the source node of the Ethernet domain, with the difference that the target nodes are part of the Ethernet domain instead of the MPLS domain.

According to still another aspect an interworking node is provided for transferring a message in a communication system, the interworking node configured to connect a Multiple Protocol Label Switching (MPLS) domain with an Ethernet domain, wherein the MPLS domain comprises a source node and the Ethernet domain comprises target nodes, the interworking node further configured to: i) receive from the source node a message comprising an identifier of the source node, an identifier of the interworking node, and an identifier of a certain target node of the target nodes, ii) convert the message from an MPLS format to an Ethernet format, iii) send the converted message to the certain target node, iv) receive from the certain target node a reply to the converted message, v) convert the reply from an Ethernet format to an MPLS format, and vi) send the converted reply to the source node.

The interworking node where the source node is a part of the MPLS domain may implement all features described above and applicable when the source node is part of the Ethernet domain, with the difference that the target nodes are part of the Ethernet domain instead of the MPLS domain.

When the target nodes are part of the Ethernet domain, then the identifier of the source node may comprise an MPLS type address, the identifier of the interworking node may comprise an MPLS type address and the identifier of the certain target node may comprise an Ethernet type address. Also, any message conversions are done the opposite way.

The nodes and the methods focus e.g. on the Ethernet address and MPLS address mapping in Loopback and Linktrace between Ethernet domain and MPLS domain. However, the Ethernet address and MPLS address mapping can be used for other types of data transfer and/or OAM messages as well.

As will be described, a special identifier for a target node is used, for example in form of an additional Interworking (IW) Type Length Value (TLV) for Ethernet Loopback/Linktrace and an additional IW TLV for MPLS Loopback/Linktrace. The IW function defined by the IW node performs address mapping based on pre-configured rules and the information received from the IW TLVs.

For example, a Loopback request from Ethernet domain may carry an Ethernet IW TLV which includes information of MPLS domain destination address (e.g. a node Destination Address). This Loopback request may use the MAC address pointing to the IW node. An IW functionality in the IW node can find this Ethernet IW TLV and can understand that the Loopback request points to the neighboring MPLS domain. It may then check the Ethernet IW TLV and get the MPLS destination address.

The Ethernet LBM may then be translated to MPLS LBM by IW node. The IW node can send it to the destination address. MPLS LBM may carry an MPLS IW TLV which includes the information of Ethernet domain source address (e.g. the MAC Source Address).

When MPLS LBR returns to the IW node, it can carry an MPLS IW TLV which includes the information of Ethernet domain destination address (copied from the MPLS IW TLV of received MPLS LBM.) The IW node may translate the MPLS LBR to Ethernet LBR and feedback to Ethernet domain. The Ethernet domain destination address can be derived from the MPLS IW TLV and the Ethernet LBR may carry an Ethernet IW TLV that includes the MPLS domain source address of the LBR.

The Linktrace IW works in the similar way. The topology information gathered by using Linktrace may be stored in the IW TLV to be transmitted from one domain to the other domain.

BRIEF DESCRIPTION OF THE DRAWINGS

Embodiments of the invention will now be described, by way of example, with reference to the accompanying schematic drawings, in which.

DETAILED DESCRIPTION

Figure 1:
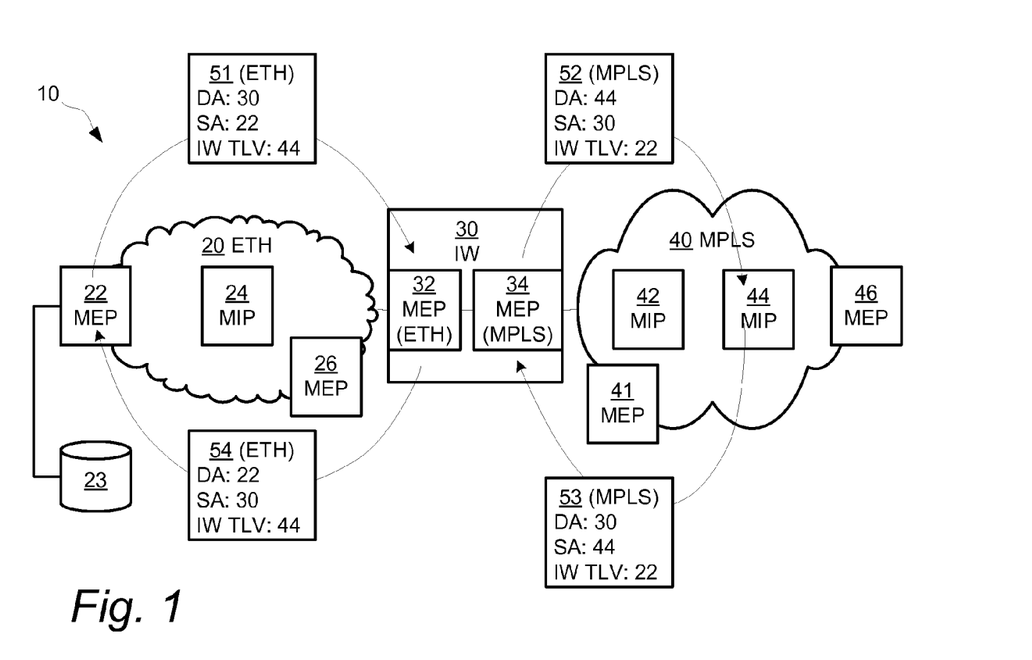
FIG. 1 illustrates a communication system with an Ethernet network that is connected to MPLS network, and how Loopback can be performed

With reference to FIG. 1 a communication system 10 is illustrated which comprises an Ethernet network 20 and an MPLS network 40 that are interconnected by an interworking (IW) node 30. The IW node 30 comprises an Ethernet module 32 that can communicate with the Ethernet domain 20 and comprises an MPLS module 34 that can communicate with the MPLS domain. Herein, the Ethernet network 20 is also referred to as an Ethernet domain while the MPLS network 40 is referred to as an MPLS domain.

Each of the domains 20, 40 comprises a number of nodes which has a respective unique address, which can be referred to as a unique identifier.

The Ethernet domain 20 is implemented in accordance with the standard IEEE802.1ag Connectivity Fault Management and thus provides capabilities for detecting, verifying and isolating connectivity failures on an end-to-end basis through the Ethernet domain 20. Mechanisms such as Continuity Check (CC), Loopback and Linktrace are supported.

The Ethernet domain 20 implements Ethernet Operations, Administration, and Maintenance/Management (OAM), which operates in the context of Maintenance Entities (MEs) that describe a relationship between two points (nodes) of a point to point connection or among multiple points of a multipoint-to-multipoint Ethernet network. The end points are so called Maintenance Association End Points (MEPs), which are the functions that generate and process OAM frames to monitor and maintain the Maintenance Association (MA). There may be Maintenance Domain Intermediate Points (MIPs) between MEPs. MIPs can respond to OAM messages but cannot generate them. These points (nodes) in the Ethernet domain can be IEEE 802.1Q compliant Bridges.

The Ethernet Loopback mechanism includes unicast Loopback message (LBM) that may be sent out by a source node 22 in the Ethernet domain 20 when it shall detect fault or wants to confirm successful initiation or restoration of connectivity. The source node 22 is typically a MEP.

The LBM sent by source node 22 can be received by a MEP, such as target (destination) node 26 which can reply with a Loopback reply (LBR) by simply reversing the destination address and source address of the LBM and send it back to the source node 22.

LBMs are transmitted in response to a command from an operator and are initiated by the source node 22 and comprises a specified destination address, priority, and drop eligible parameters, where the destination address can be the individual MAC address of another target node, such as target node 26 within the same MA as the transmitting source node 22. The target node 26 responds to the LBM with a unicast LBR. Table 1 shows an Ethernet LBM/LBR frame format that may be used. Loopback Transaction Identifier is 4 octets long and is used for differentiating consecutive LBMs.

TABLE 1

Ethernet LBM and LBR frame format

| | Octet |
|---|---|
| Common CFM Header | 1-4 |
| Loopback Transaction Identifier | 5-8 |
| Reserved for definition in future versions of the protocol | |
| Optional LBM/LBR TLVs | First TLV Offset + 5 |
| End TLV (0) | First TLV Offset + 5, if no Optional LBM/LBR TLVs are present |

Loopback may be used for the purpose of e.g. i) sending Loopback to successive MIPs, such as to node 24, for determining the location of a fault, and ii) testing of bandwidth, reliability, or jitter of a service by sending a high volume of Loopback messages.

Also, a multicast Linktrace Message (LTM) can be transmitted in order to perform path discovery and fault isolation. The LTM is transmitted by operator command and can be initiated by the source node 22. LTM can as part of its payload carry an address of a target node, such as node 26, for example in the form of a MAC address, and the address of the source node 22, e.g. in form of a MAC address. The LTM is relayed in a manner known within the art through the Ethernet domain 20 until it reaches the MP 26 in the MA. Common, suitable techniques and standards are used for relaying various types of messages in the Ethernet domain 20, which applies for each node of the Ethernet domain, such as e.g. the source node 22 and the IW node 30, or more particularly the Ethernet module 32 of the IW node 30.

The source node 22, i.e. the originating MEP, may collect the LTRs which can be received in response to the LTM, and may provide sufficient information to construct the sequence of nodes that would be traversed by a data frame sent to the target MAC address, i.e. in this example to target node 26.

Table 2 shows a suitable Ethernet LTM frame format, while Table 3 shows a suitable Ethernet LTR frame format.

TABLE 2

Ethernet LTM frame format

| | Octet |
|---|---|
| Common CFM Header | 1-4 |
| LTM Transaction Identifier | 5-8 |
| LTM TTL | 9 |
| Original MAC Address | 10-15 |
| Target MAC Address | 16-21 |
| Reserved for definition in future versions of the protocol | |
| Additional LTM TLVs | First TLV Offset + 5 |
| End TLV (0) | First TLV Offset + 5, if no Additional LTM TLVs are present |

TABLE 3

Ethernet LTR frame format

| | Octet |
|---|---|
| Common CFM Header | 1-4 |
| LTR Transaction Identifier | 5-8 |
| Reply TTL | 9 |
| Relay Action | 10 |
| Reserved for definition in future versions of the protocol | |
| Additional LTR TLVs | First TLV Offset + 5 |
| End TLV (0) | First TLV Offset + 5, if no Additional LTR TLVs are present |

The Common CFM Header is shown in Table 4. The so called Maintenance Domain Level (MD level), version, Operation Code (OpCode), Flags and First TLV Offset fields constitute the Common CFM Header. The OpCode field specifies the format and meaning of the remainder of CFM Protocol Data Unit (PDU), Examples of values can be LBR OpCode=2, LBM OpCode=3, LTR OpCode=4 and LTM OpCode=5. The use of the Flags field is defined separately for each OpCode.

TABLE 4

Common CFM Header format

| | Octet |
|---|---|
| MD Level | 1 (high-order 3 bits) |
| Version | 1 (low-order 5 bits) |
| OpCode | 2 |
| Flags | 3 |
| First TLV Offset | 4 |
| Varies with value of OpCode | 5 |
| End TLV (0) | First TLV Offset + 5 |

The MPLS domain 40 is implemented in accordance with the MPLS Transport Profile (TP) as defined by the IETF (Internet Engineering Task Force), and includes enhanced transport capabilities, in which OAM functionality. Thus, the MPLS domain can be referred to as in MPLS-TP domain. This applies for all nodes of in the MPLS domain, such as nodes 42, 44, 46 as well as the IW node 30, or more specifically, the MPLS module 34 of the IW node 30.

MPLS (-TP) implements OAM functionality which operates in the context of MEs that describe a relationship between two points (nodes) of a point to point transport path or a root and a leaf of a point to multipoint transport path. These two points are generally called MEPs. In between these two points, zero or more intermediate points called MIPs may exist. The points (nodes) in the MPLS domain can be implemented as LER/LSR (Label Edge Router/Label Switching Router) for an LSP (Label Switching Path) or the T-PE (Terminating-Provider Edge)/S-PE (Switching-Provider Edge) for a MS-PW (multi-segment Pseudowire).

Functions in the MPLS domain 40 that correspond to Ethernet Loopback and Linktrace OAM functions are called On-demand CV (connection verification) and Route Tracing. These two OAM functions can be implemented by extending LSP Ping in accordance with IETF draft-nitinb-mpls-tp-lsp-ping-extensions-01. The purpose of the extension is to enable non-IP address usage in the LSP Ping. On-demand CV can be performed by LSP Ping Echo function and Route Tracing is provided by using LSP Ping Traceroute.

As implied, the above described implementation and configuration of the MPLS domain 40 applies for all nodes of in the MPLS domain, such as nodes 41, 42, 44, 46 and the MPLS module 34 of the IW node 30.

Figure 2:
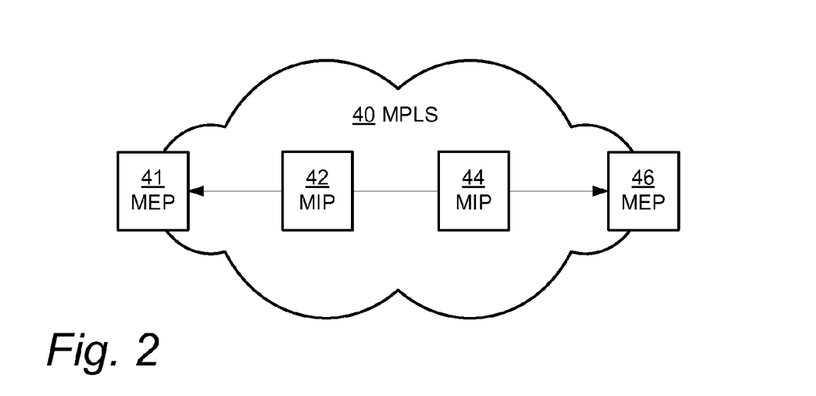
FIG. 2 illustrates the MPLS network of FIG. 1.

With further reference to FIG. 2, assuming a bidirectional MPLS-TP LSP, where 41, 42, 44 and 46 are MPLS capable nodes, MPLS-TP LSP Loopback and Linktrace is illustrated. Node 41 and node 46 act as MEPs while node 42 and node 42 act as MIPs. Here, it can be noted that the MPLS domain 40 and the nodes of FIG. 2 correspond to the MPLS domain and nodes of FIG. 1. Each of the nodes 41, 42, 44, 46 can be considered a target node in case a message in intended for that node. In this example of addressing target nodes in the MPLS domain 40 it is assumed that a network operator wants node 41 (acting as a source node) to send LBM to node 44 (acting as a target node), and then node 44 loops back the packets sent from node 41. Loopback can then be performed for the OAM control packets.

MPLS-TP Linktrace in the MPLS domain 40 can be accomplished by using MPLS-TP LSP Ping Traceroute messages. Traceroute messages originating at a node in form of a MEP can be directed to any node in form of a MIP or MEP along the MPLS-TP LSP.

The objective of Linktrace in the MPLS domain is to verify the MPLS-TP LSP from node 42 to node 44. In response to the MPLS-TP LSP Ping Traceroute request, each MIP/MEP along the path of the MPLS-TP LSP sends back a reply.

The implemented MPLS-TP Loopback and Linktrace mechanism can be based on the associated channel header (ACH) defined by IETF (see draft-nitinb-mpls-tp-lsp-ping-bfd-procedures-02).

An example of a Generic Associated Channel (G-ACh) packet format for a LSP is shown in Table 5 below, while an example of G-ACh packet format for a PW is shown in Table 6.

TABLE 5

MPLS-TP Loopback/Linktrace G-ACh Packet format for a LSP

| | |← - - - - - - - - - 4 octets - - - - - - - - - →| |
|---|---|---|---|
| | MPLS Tunnel label(s) | | |
| | GAL | | |
| ACH | 0001 Version Reserved | | Channel Type |
| ACH TLV Header | Length | | Reserved |
| | Zero or more ACH TLVs | | |
| | G-ACh Message | | |

TABLE 6

MPLS-TP Loopback/Linktrace G-ACh Packet format for a PW

| | |← - - - - - - - - - 4 octets - - - - - - - - - →| |
|---|---|---|---|
| | MPLS Tunnel label(s) | | |
| | PW label | | |
| ACH | 0001 Version Reserved | | Channel Type |
| ACH TLV Header | Length | | Reserved |
| | Zero or more ACH TLVs | | |
| | G-ACh Message | | |

Note that for PWs, the control word may be present in the encapsulation when Associated Channel Header (ACH) is used to realize the associated control channel.

In the ACH, as indicated in Table 5 and Table 6, the first nibble is set to 0001b to indicate a control channel associated with a PW, LSP or Section. The Version field is set to 0. The reserved bits must be set to 0 and ignored on reception. Bits 16 to 31 are used to encode the possible Channel Types such as Loopback or Linktrace.

If the ACH Channel Type definition does state that one or more source addresses ACH TLVs may precede the G-ACh message, an ACH TLV Header must in one embodiment follow the ACH. The Length field specifies the length in octets of the complete set of TLVs including sub-TLVs that follow the ACH TLV Header. A length of zero can indicate that no ACH TLV follows this header.

An ACH TLV consists of a 16-bit Type field, followed by a 16-bit Length field that specifies the number of octets of the Value field, which follows the Length field. This 32-bit word is followed by zero or more octets of Value information. Note the Value field of ACH TLVs may contain sub-TLVs.

To obtain improved visibility between the Ethernet domain 20 and the MPLS domain 40, or if one domain 20 or 40 does not allow the other domain's OAM, interworking functionality between the two domains 20, 40 is added in form of the IW (or "intermediate") node 30.

The IW node 30 allows the Ethernet domain 20 to have OAM access/visibility in the MPLS-TP domain 40, and/or vice versa. This is particularly useful if the Ethernet domain 20 and the MPLS-TP domain 40 belong to the same operator who then can obtain a seamless OAM across both domains 20, 40. For example, the operator may desire to run OAM tools in Ethernet domain 20 and get information from both Ethernet 20 and MPLS-TP domain 40.

When OAM interworking is to be performed, especially Loopback and Linktrace interworking for better visibility of the other domain, it is taken into account that the destination address of Ethernet Loopback/Linktrace uses MAC addresses, while MPLS-TP Loopback/Linktrace relies on MPLS-TP identifiers to locate the nodes. This can also be applied for other types of data transmission, i.e. not only for the purpose of OAM, where an address or identifier of a node in another type of domain is required.

For providing cooperation between the two domains 20, 40, the IW node 30 maps the two different types of destination addresses (identifiers) so the operator can run OAM tools in one domain and get information from both domains, i.e. a form of translation mechanism can be accomplished.

For the address mapping between Loopback and Linktrace between the Ethernet domain 20 and MPLS-TP domain 40, an Interworking TLV for Ethernet domain is implemented, as illustrated by Table 7.

TABLE 7

Interworking TLV for Ethernet OAM messages

Type = (TBD)
Length
MPLS-TP Source/Destination Address
Record Route
Reserve

For table 7 the following properties are employed:

Type—to choose from a reserved TLV value in IEEE Standard 802.1.

Length—the actual value which is decided by the length of MPLS-TP Source/Destination Address and the Record Route and the reserved bits for any future extension.

MPLS-TP Source/Destination Address—this address is derived from Static LSP Sub-TLV or Static Pseudowire Sub-TLV as defined in IETF draft-nitinb-mpls-tp-lsp-ping-extensions-01. It can be an IPv4, IPv6 or MEP/MIP IDs.

Record Route—can be zero in Loopback message, Loopback Reply and Linktrace message. Record Route can be assigned a value particularly in case for a Linktrace Reply. The Record Route includes the node addresses (identifiers) of each node on the path of the MPLS-TP LSP. Thus, it contains the result of Linktrace in the MPLS-TP domain.

Reserve—reserved for future extension.

For the address mapping between Loopback and Linktrace between the Ethernet domain 20 and the MPLS-TP domain 40, an Interworking TLV for MPLS-TP domain can be implemented, as illustrated by Table 8.

TABLE 8

Interworking TLV for MPLS OAM messages

Type = (TBD)
Length
Ethernet Source/Destination address
Record Route
Reserve

For table 8 the following properties are employed:

Type—to choose from a reserved TLV value in MPLS-TP.

Length—the actual value can be decided by the length of Source/Destination MAC Address and the Record Route and the reserved bits for future extension.

Ethernet Source/Destination Address—this address is the node (MEP/MIP) addresses in the Ethernet domain.

Record Route—it is zero in Loopback message and Linktrace request message. It is only meaningful in Linktrace reply message. The Record Route includes the MAC addresses of each node (MEP/MIP) through which the Linktrace Message flowed in the Ethernet domain 20.

Reserve—reserved for any future extension.

Turning back to FIG. 1, a Loopback and Linktrace interworking example is illustrated in detail. As mentioned, the Ethernet domain 20 and the MPLS domain 40 are interconnected by the IW node 30. The Ethernet module 32 of the IW node 30 faces Ethernet domain 20 has an Ethernet interface configuration common with the nodes 22, 24 and 26.

The MPLS module 34 of the IW node 30 faces MPLS domain 20 has an MPLS interface configuration common with the nodes 41, 42, 44 and 46. In the following a step by step example of Loopback Interworking is given, where it is assumed that a Loopback message shall be sent from node 22 to node 44 and gets its Loopback Reply.

Figure 7:
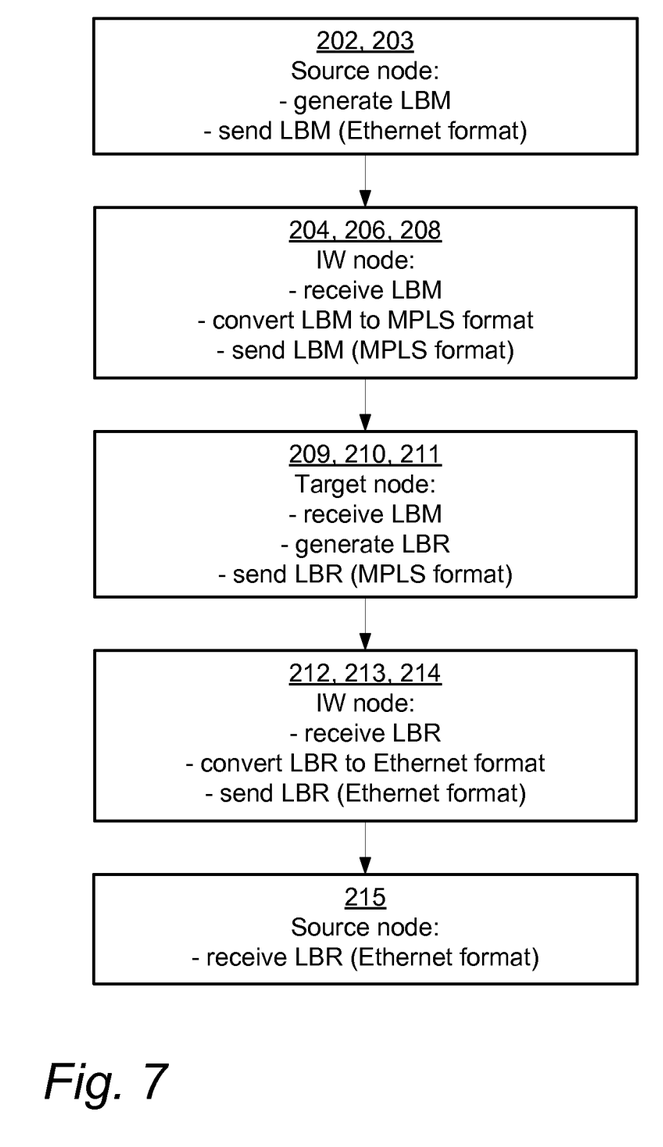
FIG. 7 illustrates a method for performing Loopback in the communication system of FIG. 1.

In a first step, and with additional reference to FIG. 7, node 22 acts as a source node and generates 202 and sends 203 a Loopback message 51 in an Ethernet format. The generated message 51 has a destination address (DA) that identifies the IE node 30, a source address that identifies the source node 22 and an IW TLV that identifies the node 44 which acts as a target node. The IW TLV that identifies the node 44 is retrieved from a database 23 that is connected to the source node and comprises information in form of IW TLV-values that identifies target nodes in the MPLS domain 40, such as nodes 41, 42, 44 and 46 as well as any other node that might be targeted or addressed.

The message also includes priority and drop eligibility parameters. More particularly, the destination address can be the MAC address of the Ethernet module 32 of the IW node 30. The final (true) destination address of target node 44 is stored in the Ethernet IW TLV. The message 51 is sent from the node 22 and conveyed in the Ethernet domain 20 according to known techniques and standards.

In a next step the Ethernet module 32 of IW node 30 receives 204 the Loopback message 51. The IW node 30 then detects the Ethernet Interworking TLV, i.e. the destination address of target node 44, and understands the Loopback message 51 is pointed to the neighboring MPLS-TP domain 40, since it comprises an address to a node in the MPLS-TP domain 40.

In a next step The Ethernet Loopback message 51 is translated 206 (i.e. converted) to MPLS-TP Loopback message 52 with the destination address set as the address of node 44. The source address is then set to the address if the IW node 30, or more particularly to the address of the MPLS module 34 of the IW node 30. The translation per se is performed according to any suitable techniques and standards. The IW node 30 changes the IW TLV such that it identifies the source node 22, for example by the MAC address of node 22, which was given by the source address in message 51.

In a next step the IW node 30 sends 208 the translated MPLS-TP Loopback message 52 to node 44, which is done according to known techniques within field of MPLS technology.

In a next step the target node 44 receives 209 the MPLS-TP Loopback message 52 and generate 210 an MPLS-TP Loopback Reply 53. The constructions of the reply is done according to known techniques within field of MPLS technology, with account taken to the IW TLV value that identifies the source node 22. Basically, this includes switching the values of the source address with that of the destination address, i.e. the destination address of the MPLS-TP Loopback Reply 53 is the IW node 30, or more particularly the address of the MPLS module 34 of the IW node 30. The true destination address, i.e. the MAC address of node 22 is as mentioned stored in the MPLS-TP Interworking TLV. The MPLS-TP Loopback Reply 53 is sent 211 from the node 44 and conveyed in the MPLS domain 40 according to known techniques and standards.

In a next step the MPLS module 34 of IW node 30 receives 212 the Loopback Reply 53. After detecting the MPLS-TP Interworking TLV, the IW node 30 understands the Loopback Reply is pointed to the neighboring Ethernet domain 20. The MPLS-TP Loopback Reply 53 is then translated 213 (i.e. converted) by the IW node 30 into an Ethernet Loopback Reply 54 with the destination address set as the MAC address of node 22. The translation per se is performed according to any suitable techniques and standards. The Ethernet Loopback Reply 54 then has the destination address set to the address of node 22, which was retrieved from the Interworking TLV, and the source address set to the address of the IW node 30. The Interworking TLV is in turn set to the previous source address, i.e. to the source address of MPLS-TP Loopback Reply 53. The Ethernet Loopback Reply 54 is sent 214 from the node 44 and conveyed in the Ethernet domain 40 according to known techniques and standards.

Finally node 22 receives 215 the Ethernet Loopback Reply 54 with an Ethernet Interworking TLV which has the source address of node 48.

When a Linktrace message is to be sent from node 22 to node 44 and a subsequent Linktrace Reply is to be received by the node 22 other method steps are taken.

Figure 3:
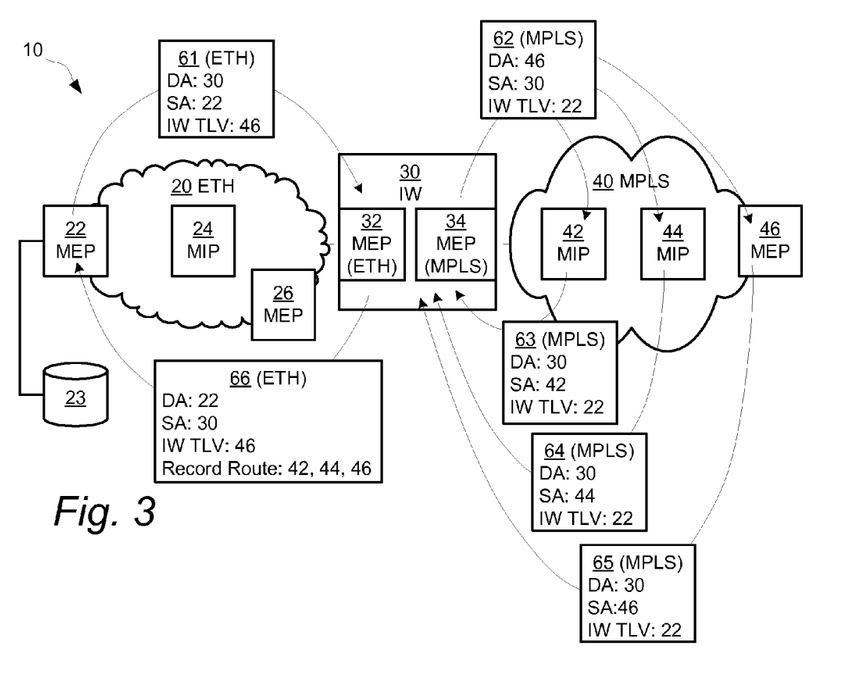
FIG. 3 illustrates the communication system of FIG. 1, and how Linktrace can be performed.
Figure 8:
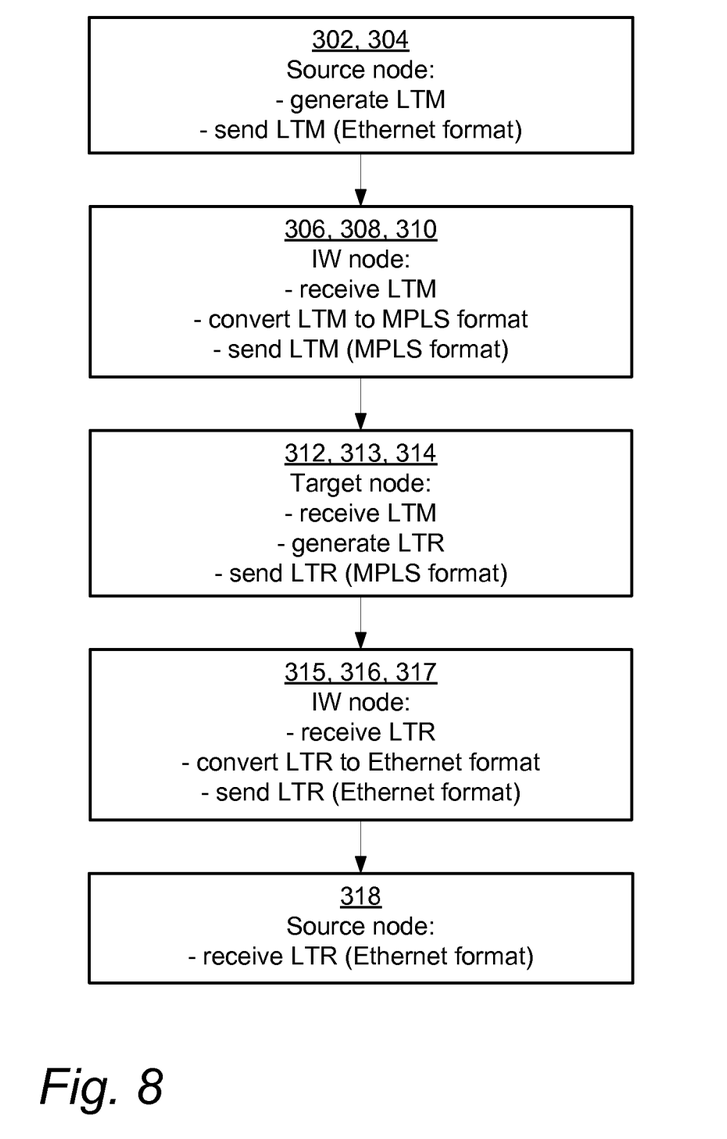
FIG. 8 illustrates a method for performing Linktrace in the communication system of FIG. 1.

Then, with reference to FIG. 3 and with additional reference to FIG. 8, in a first step a Linktrace Message (LTM) 61 is generated 302 by the source node 22. The LTM carries in this example a destination address that identifies IW node 30, a source address that identifies the source node 22 and a final destination address of target node 46 that is stored in the Ethernet Interworking TLV. The destination and source address can be the MAC addresses of the respective node. The Linktrace message 61, which has an Ethernet format, is then sent 304 by the source node 22 to the destination identified by the destination address. Any transfer of messages within the Ethernet domain is done according to suitable techniques and standards. The address of the target node 46 can be retrieved form the database 23.

In a next step the Ethernet module 32 of IW node 30 receives 306 the Linktrace message 61. After detecting the Ethernet Interworking TLV, IW node 30 understands that the Linktrace message 61 is pointed to the neighboring MPLS-TP domain 40. The Ethernet Linktrace message is converted 308 to an MPLS-TP Linktrace message 62 with the destination address set to the IW TLV of message 61, i.e. to the address of node 46. The source address is set to the address of the IW node 30 and the Interworking TLV is set to the address of the source node 22. The translation per se is performed according to any suitable techniques and standards. The translated message 62 is now an MPLS-TP Linktrace message that carries an MPLS-TP Interworking TLV which has the MAC address of source node 22.

In a next step the MPLS-TP MEP of IW node 30 sends 310 the translated MPLS-TP Linktrace 62 message with target source 46, in a manner known within the art. As the message is a Linktrace message, it is conveyed through a number of nodes 42, 44 until it reaches the target node 46.

In a next step the target node 46 receives 312 the MPLS-TP Linktrace message 62 and generates 313 an MPLS-TP Linktrace Reply 65. The destination address of the Linktrace Reply is the address the IW node 30. The source address set to the address of the target node 46 and the actual destination address is the MAC address of node 22, which is stored in the MPLS-TP Interworking TLV. The same applies for all nodes 42, 44 through which the message is conveyed, with the difference that the source address is set to the address of the node through which the message 62 was conveyed. Thus, additional MPLS-TP Linktrace Replies 63, 64 are constructed and sent 314 by the nodes 42, 44 to the IW node 30.

In a next step the MPLS-TP module 34 of IW node 30 receives 315 the Linktrace Replies 63, 64 and 65, which can be seen as one Linktrace reply. After detecting the MPLS-TP Interworking TLV in the reply, the IW nodes 30 understands that the Linktrace Reply is pointed to the neighboring Ethernet domain 20. The MPLS-TP Linktrace Reply is converted 316 to an Ethernet Linktrace Reply 66 with the destination address set as the MAC address of source node 22, i.e. the MPLS-TP Linktrace Reply is sent 317 to the IW node 30. The Ethernet Loopback Reply 66 now carries an Ethernet Interworking TLV which has the address of node 46. The topology information gathered by MPLS-TP Linktrace Reply is stored in the Record Route of the Ethernet Interworking TLV, and thus identifies nodes 42, 44 and 46.

In a final step the source node 22 receives 318 the Ethernet Linktrace Reply 66 with an Ethernet Interworking TLV, which now comprises the source address of LSR node 46's MEP and the topology information of MPLS-TP domain 40.

IW node 30 is configured to differentiate the OAM messages targeting itself or the other domain. This can be accomplished by arranging the IW node 30 such that it checks all the possible TLVs. If there is an IW TLV attached to an OAM messages, the IW node 30 knows the destination address of the message is in the other domain. This check may however be slow and resource consuming for the IW node 30 as it must check all the possible TLVs to know if the message is destined to itself or to the other domain. A possible way to address this issue is to introduce an additional Flag (e.g. in Table 4) in the Ethernet domain 20 for Linktrace, Linktrace Reply, Loopback and Loopback Reply. The additional Flag indicates that the message has an IW TLV and is destined toward the other domain. In the MPLS-TP domain, one bit in the reservation field of the ACH (see Table 5 and Table 6) may be used to indicate that the message has IW TLV and is destined toward the other domain.

Figure 4:
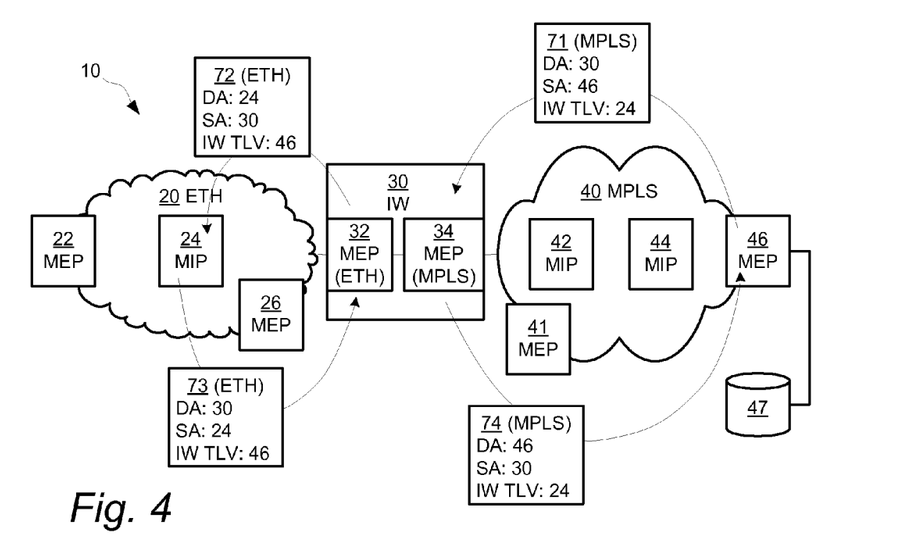
FIG. 4 illustrates a communication system with an Ethernet network that is connected to MPLS network, just like FIG. 1 but with the difference that messages are generated in send in the opposite direction.

With further reference to FIG. 4, it should be noted that the interworking functionality described above can be reversed. Then the source node can be node 46 in the MPLS domain 40 which retrieves a target address from a database 47. The target address is then, for example, a target node 24 in the Ethernet domain 20. Messages can then be generated and conveyed in manner similar with the process described in connection with FIGS. 1 and 3, with the difference that directions and message translations are reversed. However, this embodiment is still based on the previously described same principles, which includes the IW TLV.

In the deployment of the interworking functionality described herein, information about target addresses in a domain may be auto populated and bound at the IW node 30 such that it can perform the conversion described herein. Also, an operator on one domain knows what address to use on the other side of the domain (e.g. populate the TLVs) when launching LB/LT.

In detail, this can be readily solved since IW node 30 does not have to store any address information at all. All the information that it needs is provided by the TLV of the incoming LB/LT messages. The source node 22 is responsible for providing this information when constructing the original LB/LT, by retrieving it from the database 23.

Figure 5:
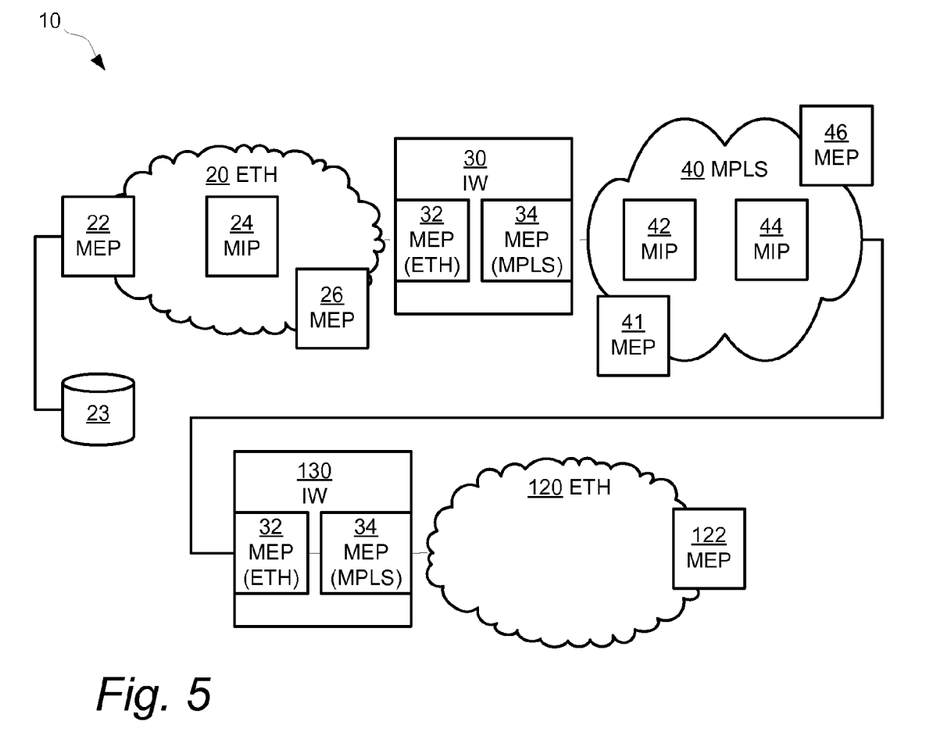
FIG. 5 illustrates the communication system of FIG. 1 but extended with an additional Ethernet domain, and how identifiers in the MPLS domain can be collected.

For example, with reference to FIG. 5 Loopback and Linktrace interworking initialization is described. In this case the MEP at the end of the overall Ethernet service at node 62 which is located at the right side of the MPLS-TP domain is considered, and interworking initialization may be achieved by the following steps:

In a first step node 22 initiates an LTM having as its target address the MAC address of node 122, which is available in the database 23.

In a next step the LTM is propagated according to conventional techniques though a first Ethernet domain 20 and intermediate nodes such as nodes 24, 26 send LTRs back to the source node 22 and propagate the LTM further as usual. The only difference now is that the LTRs initiated by IW nodes, such as the IW node 30 always contain the additional TLV which gives information on how to address nodes in the other domain 40. Accordingly, the IW node is configured to have the Interworking TLV.

In a next step the source node 22 stores the received LTR information as usual but now there is now an additional column which contains information on how to address the IW nodes, such as node 30 and 130.

In a next step a new LTM is sent form the source node 22 containing the IW TLV which has the MPST-TP destination address of the IW node 130 in its corresponding field. Here, IW node 130 connects the MPLS domain 40 with a further Ethernet domain 120.

In a next step the LTM is propagated to the first IW node 30 which based on the IW TLV initiates an LTM on the MPLS-TP domain targeted to node 122. All the intermediate MPLS-TP nodes s (such as node 41, 42, 44 and 46) will send back to the IW node 30 LTRs giving information on how these are addressed in the MPLS-TP domain. The information is sent back the source node 22 MEP by the IW node 130 in the Interworking TLV of the LTR.

In a final step the source node stores the received LTR information in the database 23 which now contains the addresses (identifiers) of the nodes in the MPLS-TP domain.

The steps above can be automated during a service initiation phase so that each source node, or MEP, is always containing the appropriate information in its database. Also, LBMs/LTMs can be sent on operator command to intermediate points in the other domain based on the information in the source node.

The nodes described herein are in addition implemented according to known standards and protocols within the field of communication over an Ethernet based network respectively a MPLS based network. Software instructions, i.e. a computer program code for carrying out the previously discussed methods may for development convenience be written in a high-level programming language such as Java, C, and/or C++ but also in other programming languages, such as, but not limited to, interpreted languages. Some modules or routines may be written in assembly language or even microcode to enhance performance and/or memory usage.

Figure 6:
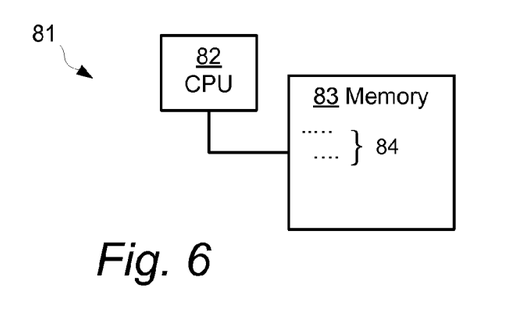
FIG. 6 illustrates some internal hardware components of nodes in the communication system.

For example and with reference to FIG. 6, the source node 22 and the interworking node can each comprise a processor 82 in form of a central processing unit that is connected to a computer readable medium (Memory) 83 that in the form of e.g. a flash memory, a hard disk or an EEPROM (Electronically Erasable Programmable Read-only Memory). The computer-readable medium 83 stores processing instructions that, when executed by a source node or IW node, performs the relevant method steps described herein.

It will be further appreciated that the functionality of any or all of the functional steps of the method may also be implemented using discrete hardware components, one or more application specific integrated circuits, or a programmed digital signal processor or microcontroller. The steps of the respective method may, as suitable, be executed in a different order while still obtaining the same, functional result.

Although various embodiments of the invention have been described and shown, the invention is not restricted thereto, but may also be embodied in other ways within the scope of the subject-matter defined in the following claims. In particular, the functionality described herein

The invention claimed is:

1. A source node for addressing target nodes in a communication system, the source node configured to be part of an Ethernet domain and the target nodes configured to be part of a Multiple Protocol Label Switching (MPLS) domain that is connected to the Ethernet domain via an interworking node, the source node comprising processing circuits configured to execute the stored processing instructions to:
 generate a message comprising
  an identifier of the source node,
  an identifier of the interworking node, and
  an identifier of a certain target node of the target nodes, said identifier of the certain target node comprises an MPLS address;
 send the message to the certain target node via the interworking node, and
 receive from the certain target node via the interworking node a reply to the message.

2. The source node according to claim 1, wherein the source node is a maintenance node for monitoring the target nodes, the source node configured to generate the message as an operations, administration and management (OAM) message.

3. The source node according to claim 2, wherein the OAM message is one of a Linktrace message and a Loopback message.

4. The source node according to claim 2, wherein the message comprises a basic OAM message that is enhanced by a value representing the identifier of the certain target node.

5. The source node according to claim 4, wherein the value representing the identifier of the certain target node comprises a type length value.

6. The source node according to claim 1, wherein the identifier of the source node comprises an Ethernet address.

7. The source node according to claim 1, wherein the identifier of the interworking node comprises an Ethernet address.

8. The source node according to claim 1, further configured to
 generate a Linktrace message comprising
  the identifier of the source node, and
  the identifier of the interworking node,
 send the Linktrace message via the interworking node to a number of additional target nodes in the MPLS domain, and
 receive from the number of additional target nodes via the interworking node a Linktrace reply to the Linktrace message, the Linktrace reply comprising identifiers of the additional target nodes.

9. The source node according to claim 8, wherein the identifiers of the additional target nodes comprise MPLS addresses.

10. The source node according to claim 8, further configured to generate a database with the identifiers of the additional target nodes in the MPLS domain.

11. The source node according to claim 1, wherein the message comprises a flag that indicates if the message comprises an identifier of a certain target node in the MPLS domain.

12. An interworking node for transferring a message in a communication system, the interworking node configured to connect an Ethernet domain with a Multiple Protocol Label Switching (MPLS) domain, wherein the Ethernet domain comprises a source node and the MPLS domain comprises target nodes, the interworking node comprising processing circuits configured to execute the stored processing instructions to:
 receive from the source node a message comprising
  an identifier of the source node,
  an identifier of the interworking node, and
  an identifier of a certain target node of the target nodes, said identifier of the certain target node comprises an MPLS address;
 convert the message from an Ethernet format to an MPLS format,
 send the converted message to the certain target node, wherein said converted message is addressed with the received Ethernet address;
 receive from the certain target node a reply to the converted message,
 convert the reply from an MPLS format to an Ethernet format, and
 send the converted reply to the source node.

13. The interworking node according to claim 12, wherein the message comprises an operations, administration and management (OAM) message.

14. The interworking node according to claim 13, wherein the OAM message is one of a Linktrace message and a Loopback message.

15. The interworking node according to claim 13, wherein the message comprises a basic OAM message that is enhanced by a value representing the identifier of the certain target node.

16. The interworking node according to claim 15, wherein the value representing the identifier of the certain target node comprises a type length value.

17. The interworking node according to claim 12, wherein the identifier of the source node comprises an Ethernet address.

18. The source node according to claim 12, wherein the identifier of the interworking node comprises an Ethernet address.

19. The interworking node according to claim 12, further configured to
 receive a Linktrace message comprising
  the identifier of the source node, and
  the identifier of the interworking node,
 convert the Linktrace message from an Ethernet format to an MPLS format,
 send the converted Linktrace message to additional target nodes in the MPLS domain,
 receive from an additional target node a Linktrace reply to the converted Linktrace message,
 convert the Linktrace reply from an MPLS format to an Ethernet format, and
 send the converted Linktrace reply to the source node, the converted Linktrace reply comprising identifiers of the additional target nodes.

20. The interworking node according to claim 19, wherein the identifiers of the additional target nodes comprise MPLS addresses.

21. The interworking node according node according to claim 12, wherein the message comprises a flag that indicates if the message comprises an identifier of a certain target node in the MPLS domain.

22. A method for a source node adapted to address target nodes in a communication system, the source node configured to be part of an Ethernet domain and the target nodes configured to be part of a Multiple Protocol Label Switching (MPLS) domain that is connected to the Ethernet domain via an interworking node, the method comprising the steps of:
　generating a message comprising
　　an identifier of the source node,
　　an identifier of the interworking node, and
　　an identifier of a certain target node of the target nodes, said identifier of the certain target node comprises an MPLS address;
　sending the message to the certain target node via the interworking node, and
　receiving from the certain target node via the interworking node a reply to the message.

23. A method for an interworking node adapted to transfer a message in a communication system, the interworking node configured to connect an Ethernet domain with a Multiple Protocol Label Switching (MPLS) domain, wherein the Ethernet domain comprises a source node and the MPLS domain comprises target nodes, the method comprising:
　receiving from the source node a message comprising
　　an identifier of the source node,
　　an identifier of the interworking node, and
　　an identifier of a certain target node of the target nodes, said identifier of the certain target node comprises an MPLS address;
　converting the message from an Ethernet format to an MPLS format,
　sending the converted message to the certain target node, wherein said converted message is addressed with the received MPLS address;
　receiving from the certain target node a reply to the converted message,
　converting the reply from an MPLS format to an Ethernet format, and
　sending the converted reply to the source node.

24. A source node for addressing target nodes in a communication system, the source node configured to be part of a Multiple Protocol Label Switching (MPLS) domain and the target nodes configured to be part of an Ethernet domain that is connected to the MPLS domain via an interworking node, the source node comprising processing circuits configured to execute the stored processing instructions to:
　generate a message comprising
　　an identifier of the source node,
　　an identifier of the interworking node, and
　　an identifier of a certain target node of the target nodes, said identifier of the certain target node comprises an Ethernet address;
　send the message to the certain target node via the interworking node, and
　receive from the certain target node via interworking node a reply to the message.

25. An interworking node for transferring a message in a communication system, the interworking node configured to connect a Multiple Protocol Label Switching (MPLS) domain with an Ethernet domain, wherein the MPLS domain comprises a source node and the Ethernet domain comprises target nodes, the interworking node comprising processing circuits configured to execute the stored processing instructions to:
　receive from the source node a message comprising
　　an identifier of the source node,
　　an identifier of the interworking node, and
　　an identifier of a certain target node of the target nodes, said identifier of the certain target node comprises an Ethernet address;
　convert the message from an MPLS format to an Ethernet format,
　send the converted message to the certain target node, wherein said converted message is addressed with the received Ethernet address;
　receive from the certain target node a reply to the converted message,
　convert the reply from an Ethernet format to an MPLS format, and
　send the converted reply to the source node.

* * * * *

UNITED STATES PATENT AND TRADEMARK OFFICE
CERTIFICATE OF CORRECTION

PATENT NO.         : 9,077,632 B2  
APPLICATION NO.    : 13/695699  
DATED              : July 7, 2015  
INVENTOR(S)        : Ding et al.

Page 1 of 1

It is certified that error appears in the above-identified patent and that said Letters Patent is hereby corrected as shown below:

In the claims

In Column 15, Lines 53-54, in Claim 8, delete "configured to" and insert -- configured to: --, therefor.

In Column 16, Line 49, in Claim 18, delete "The source node" and insert -- The interworking node --, therefor.

In Column 16, Line 53, in Claim 19, delete "configured to" and insert -- configured to: --, therefor.

In Column 17, Line 4, in Claim 21, delete "according node according to claim 12," and insert -- according to claim 12, --, therefor.

Signed and Sealed this  
Fifth Day of January, 2016

Michelle K. Lee  
*Director of the United States Patent and Trademark Office*